United States Patent [19]
Yokota et al.

[11] Patent Number: 6,152,161
[45] Date of Patent: Nov. 28, 2000

[54] VALVE LOCKOUT DEVICE

[75] Inventors: Chuckson Yokota, Fremont; Miriam Schwartz, Los Gatos; Robert J. Willis, Walnut Creek, all of Calif.

[73] Assignee: Applied Materials Inc., Santa Clara, Calif.

[21] Appl. No.: 09/177,436

[22] Filed: Oct. 21, 1998

[51] Int. Cl.[7] .................................................... F16K 35/00
[52] U.S. Cl. ................................ 137/38; 70/178; 70/180
[58] Field of Search .............................. 137/385; 70/178, 70/180

[56] References Cited

U.S. PATENT DOCUMENTS

| | | |
|---|---|---|
| D. 358,455 | 5/1995 | Kieper . |
| 566,932 | 9/1896 | Patrick . |
| 812,021 | 2/1906 | Dahl . |
| 1,683,649 | 9/1928 | Belote . |
| 3,960,168 | 6/1976 | Plympton . |
| 3,980,099 | 9/1976 | Youngblood . |
| 4,162,690 | 7/1979 | Anderson . |
| 4,538,307 | 9/1985 | Barnum et al. . |
| 5,116,018 | 5/1992 | Friemoth et al. . |
| 5,143,114 | 9/1992 | Daniels . |
| 5,215,112 | 6/1993 | Davison . |
| 5,244,008 | 9/1993 | Bauer . |
| 5,249,630 | 10/1993 | Meaders et al. . |
| 5,360,036 | 11/1994 | Kieper . |
| 5,427,135 | 6/1995 | Kieper . |
| 5,806,555 | 9/1998 | Magno, Jr. ............................... 137/385 |

*Primary Examiner*—John Fox
*Attorney, Agent, or Firm*—Peters Verny Jones Biksa

[57] ABSTRACT

A valve lockout device having two pieces. A first piece of the device is a hollow object, substantially tubular or block-shaped, open at a bottom end and having slots open on two sides, that fits over a valve whose handle is to be fixed (or locked). A pocket in the first piece receives the handle and limits the motion of the handle relative to the valve body, thereby preventing operation of the valve. A second piece of the device is a substantially U-shaped object which is pivotally attached to the first piece. When the second piece is rotated to a closed position, it captures the valve handle in the pocket of the first piece, thereby preventing the valve lockout device from being removed. When the second piece is in the closed position, a padlock loop on the first piece extends through a padlock receiving opening in the second piece. Putting a padlock through the padlock loop will prevent the second piece from being rotated out of its closed position, thereby locking the device to the valve.

25 Claims, 9 Drawing Sheets

VALVE LOCKOUT DEVICE

FIELD OF THE INVENTION

This invention relates to a valve lockout device, which is a safety device that prevents the operation of a valve.

BACKGROUND OF THE INVENTION

Figure 1:
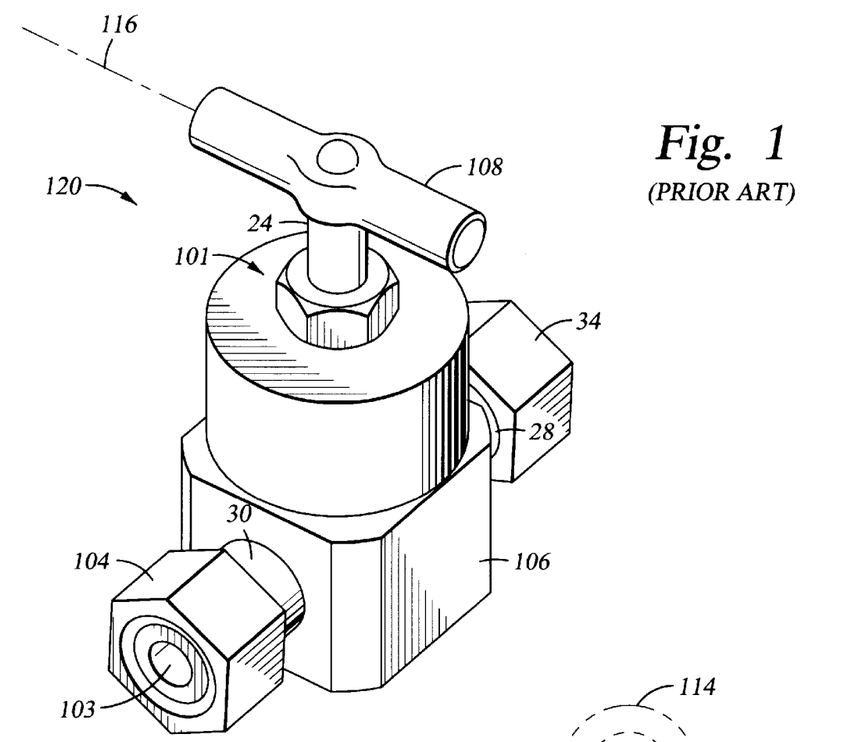
FIG. 1 is a perspective view of a typical prior art tubing-type valve.

A valve is used to control the flow of a substance through a passage such as tubing or piping. (An example of such a valve is shown in FIG. 1.) The valve typically has a valve handle which is used to operate the valve. One type of valve lockout device fits onto the valve and holds the valve handle in a particular position, typically the closed position. The lockout device can be used, for example, to prevent the valve from being operated accidentally while components downstream from the valve are being serviced. This is particularly useful where the valve is controlling isolation of a dangerous substance. For example, in processing semiconductor substrates, poisonous, corrosive, and inert gases are normally used during processing, and exposure of human beings to such gases is hazardous. For safety, isolation of the dangerous substances is required, and locking of the valve in a closed position is required by good safety practices and industrial regulations.

There are problems with existing valve lockout devices. Often valves are lined up in a valve box with very little space between them, making it difficult for the lockout devices to fit. A valve lockout device may fit a particular valve model but not other valve models, especially where the different valve models are made by different manufacturers. Some valve lockout devices may be designed so that part of the lockout device is an integral part of the valve itself, or the lockout device requires some special structure associated with the valve, or the valve must be taken apart to install the lockout device, or part of the lockout device remains attached to the valve when the rest of the lockout device is removed. Other lockout devices have several pieces which are cumbersome or difficult to join in small spaces.

SUMMARY OF THE INVENTION

The present invention provides a valve lockout device that can be installed to lock a valve which is located in tight quarters, such as where the valves are closely spaced side by side. A valve lockout device according to the invention is completely separate from the valve, requires no special structures associated with the valve, and can be configured to work with a variety of valves of different manufacturers. Such a valve lockout device is easy to install and remove, and leaves no pieces behind (attached to the valve) after removal.

A valve lockout device according to the invention has a first piece that engages a portion of the valve connection assembly comprising the valve, the piping or tubing used to connect the valve to external piping or tubing, the external piping or tubing itself, and any connection hardware (such as fittings or nuts) used to connect the valve to the external piping or tubing. When installed on a valve, a pocket in the first piece receives the valve handle and limits the movement of the valve handle relative to the valve body, thereby preventing the operation of the valve. A second piece of the valve lockout device is pivotally attached to the first piece and configured so that when the second piece is rotated to a closed position with respect to the first piece, the second piece captures the valve handle in the pocket of the first piece, thereby preventing the removal of the valve lockout device.

In another aspect of the invention, the first piece of the valve lockout device is a hollow object, open at one end and open on two sides, that fits over the valve. The hollow object has an opening for engaging the valve connection assembly.

In another aspect of the invention, the axis of the pivotal attachment is substantially parallel to the valve handle.

In another aspect of the invention, the second piece of the valve lockout device, as viewed in a plane perpendicular to the axis of the pivotal attachment, is a substantially U-shaped object.

In another aspect of the invention, the first piece of the valve lockout device has a padlock loop, and the second piece has a padlock loop opening for receiving the padlock loop. The padlock loop and the padlock loop opening are positioned so that when the second piece is in the closed position, a portion of the padlock loop protrudes through the padlock loop opening in the second piece. A pin or rod, such as a padlock, can be inserted through the protruding portion of the padlock loop to limit the movement of the second piece relative to the first piece, thereby holding the second piece in the closed position.

In another aspect of the invention, the first piece has a padlock loop and the second piece has another padlock loop. The padlock loops are positioned so that when the second piece is in the closed position, the padlock loops are aligned. A pin or rod such as a padlock inserted through the padlock loops holds the second piece in the closed position.

In another aspect of the invention, a method is provided for locking a valve in a fixed position. A valve lockout device is placed over the valve, engaging a first piece of the valve lockout device with the valve connection assembly and causing the valve handle to be received in a pocket of the first piece, thereby limiting the movement of the valve handle relative to the valve body and preventing the operation of the valve. A second piece, pivotally attached to the first piece, is rotated into a closed position with respect to the first piece, thereby causing the second piece to capture the valve handle in the pocket and preventing the removal of the valve lockout device. In another aspect, a pin or rod such as a padlock is inserted through a padlock loop, thereby holding the second piece in the closed position.

The invention provides substantial advantages and flexibility not available in prior art devices.

DETAILED DESCRIPTION

The term "valve", for example as shown in FIG. 1, will be used to refer to an assembly 101 comprising a valve body 106 having a passage therethrough (not shown), a passage blocking element (not shown) for controlling the flow of a substance through the passage, a valve stem 24 fixed to the passage blocking element, and a valve handle 108 connected to the valve stem to move the passage blocking element, thereby restricting or opening the area of the passage. The valve assembly 101, the piping or tubing 28, 30 used to connect the valve to external piping or tubing, the external piping or tubing itself (not shown), and connection hardware (such as fittings or nuts 104, 34) used to connect the valve to the external piping or tubing, will be referred to as the "valve connection assembly" 120. These elements are familiar to persons of ordinary skill in the art.

Referring to FIGS. 1, 2, 3 and 4, one embodiment of a valve lockout device 100 is used to hold the valve handle 108 in a closed position 116, to prevent the valve 101 from being operated at a time when harm might result from the flow of a substance through a fluid passage 103 of the valve connection assembly 120. A first piece 102 of the valve lockout device 100 is a hollow object, substantially tubular, open at a bottom end 105 and open on two sides 107a–b. To lock the valve, the first piece 102 fits over a portion of the valve connection assembly 120. A set of openings 117a–b (slots) in the first piece 102 engage the tubing 28, 30 between the connection nuts 104, 34 and the valve body 106. (The external piping or tubing which would connect to the connection nuts 104, 34 is not shown.) The first piece 102 also has a set of valve handle slots 109a–b at the upper end of the side openings 107a–b for receiving the valve handle 108. When the first piece 102 is engaged with the valve connection assembly 120, one or both slots 109a–b limit the motion of the valve handle 108 relative to the valve body 106. Thus, while the lower portion of the first piece 102 engages the valve connection assembly 120, the configuration of the upper portion of the first piece 102 simultaneously prevents the valve handle 108 from moving from a closed position (the closed handle orientation is represented by dashed line 116), thereby preventing operation of the valve. The first piece 102 could be designed to engage any fixed part of the valve connection assembly 120 as long as it prevents the closed position of the valve handle 108 from turning from its closed position. (The handle closed position is a valve handle position, not necessarily perpendicular with the flow path. Depending on the valve configuration, it may be parallel to it. The main criterion is that the flow restricting element of the valve be in a position where the flow through the valve is stopped or blocked.)

Figure 2:
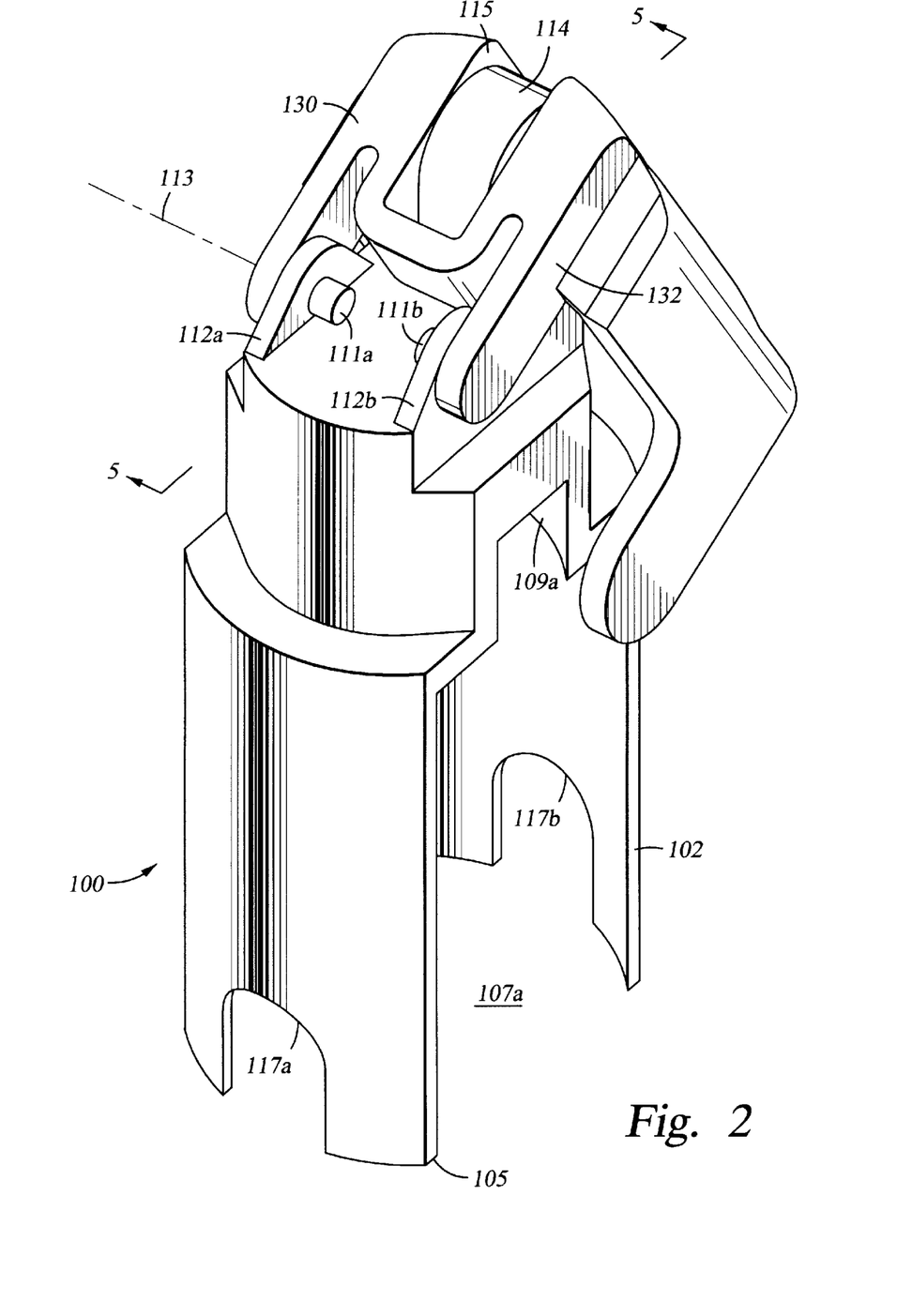
FIG. 2 is a front perspective view of a valve lockout device according to the invention in an open configuration.
Figure 3:
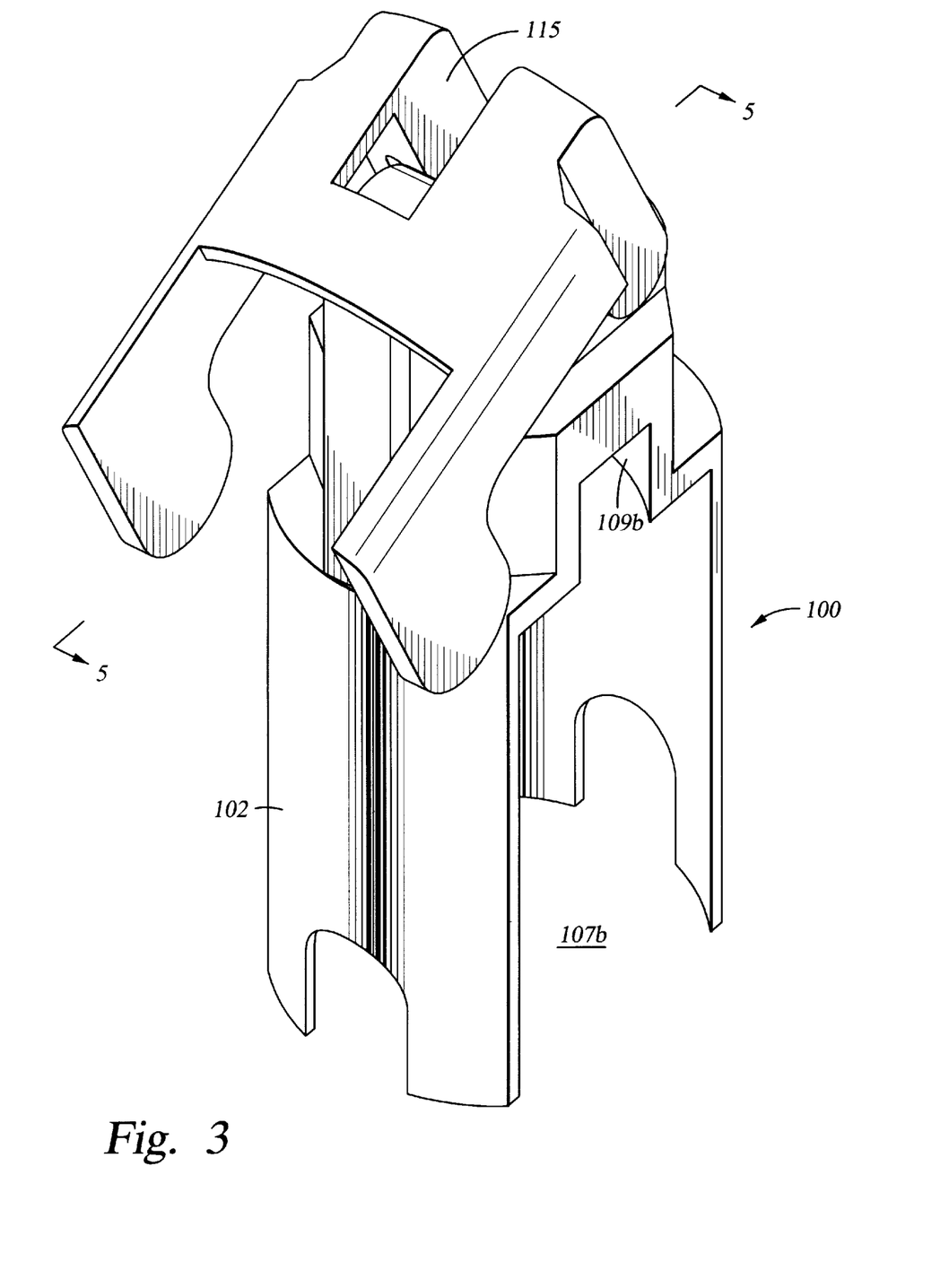
FIG. 3 is a back perspective view of the valve lockout device of FIG. 2.

A second piece 110 of the valve lockout device is hinged to the first piece 102 by pins 111a–b. As shown in FIG. 2, the pins 111a–b extend from each of the upper members 130, 132 of the second piece 110 through holes in flanges 112a–b which extend from the top of the first piece 102.

Figure 4:
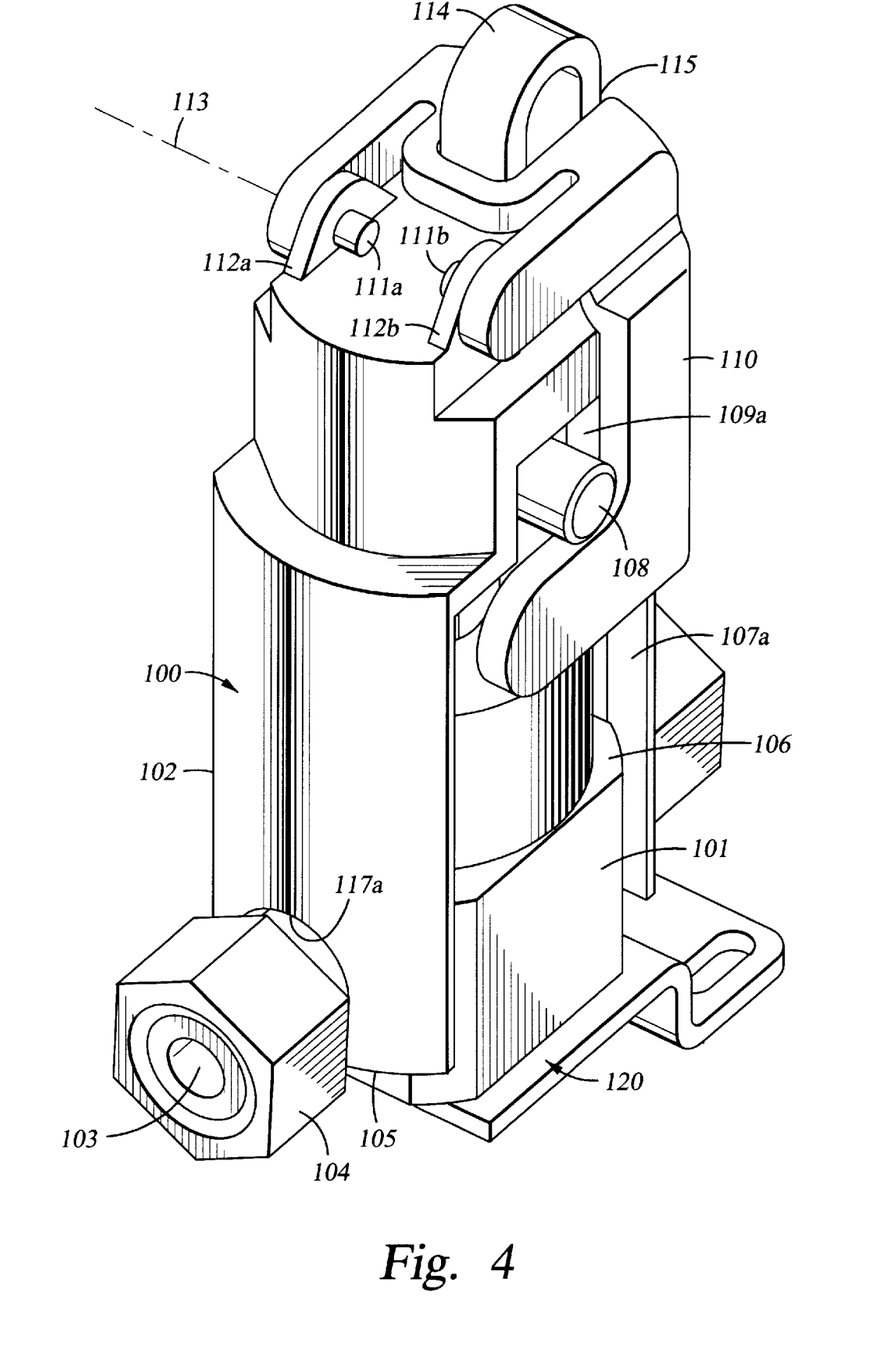
FIG. 4 is a perspective view of a tubing-type valve with a valve lockout device according to the invention installed on it.
Figure 5:
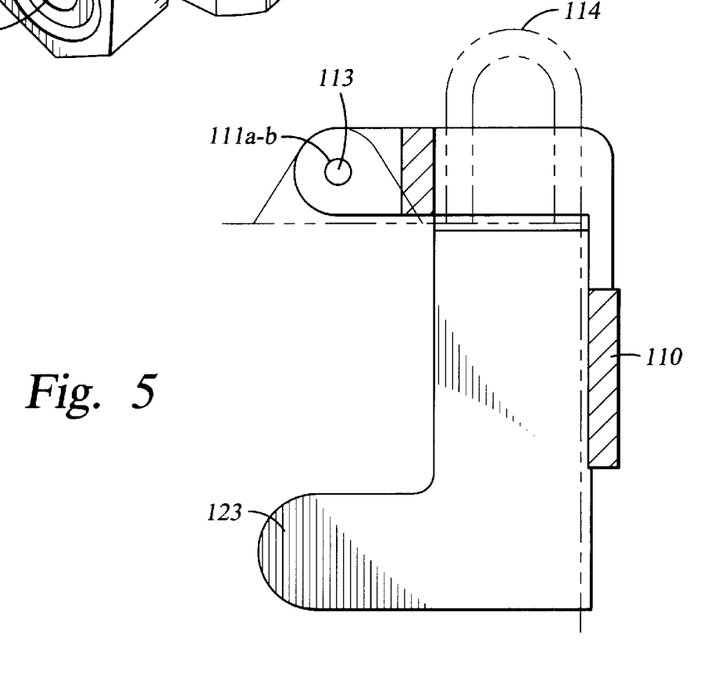
FIG. 5 is a side cross-sectional view of the second piece of the valve lockout device of FIG. 4, shown in a plane perpendicular to the pivot axis.

FIG. 5 is a side cross-sectional view of the second piece 110 taken at a center of the lockout device in a plane perpendicular to the pivot axis 113. An upper portion of the first piece is shown in dashed lines. In this view, it can be seen that the second piece 110 appears to be a substantially U-shaped object, where one leg of the "U" is a closure lever arm 123 and the pivot attachment is near the end of the opposite (upper) leg of the "U." The pivot axis 113 is oriented substantially parallel to the valve handle 108. Any type of pivot or hinge could be used, as long as the second piece 110 can rotate about a pivot axis such as 113. When the second piece 110 is rotated to a closed position when engaged with the valve, as shown in FIG. 4, it closes the set of valve handle slots 109a–b, thereby capturing the valve handle 108 inside the set of valve handle slots 109a–b. Removal of the valve lockout device 100 from the valve 101 is prevented by interference between the valve handle 108 and the closure lever arm 123 of the second piece 110, which crosses the opening of the outside of the valve handle slots and is positioned under the valve handle 108 extending therethrough. In another arrangement, the closure lever arm 123 may be positioned closer to the center of the valve and pass through a hole in the side of the first piece rather than over the outside. The valve lockout device cavity is sized so that it works with a variety of valves from different manufacturers. The valve lockout device can be made of metal or injection molded plastic such as nylon.

While the second piece is shown as being a U-shaped object, the second piece may be an L-shaped piece with the pivot at the outside of the top and a locking loop along the side of the first piece.

In this embodiment, the first piece 102 includes a padlock loop 114 extending therefrom. When the second piece 110 is in its closed position, as shown in FIG. 4, an opening 115 in the second piece 110 receives the padlock loop 114. A portion of the padlock loop protrudes through the opening 115 so that putting a pin or rod such as a padlock (not shown) through the padlock loop 114 will prevent the second piece 110 from being rotated out of its closed position. Thus engagement of a padlock will prevent the valve lockout device 100 from being removed from the valve 101. As long as the lockout device 100 cannot be removed, the valve handle 108 cannot be turned, so the valve cannot be opened.

Figure 6:
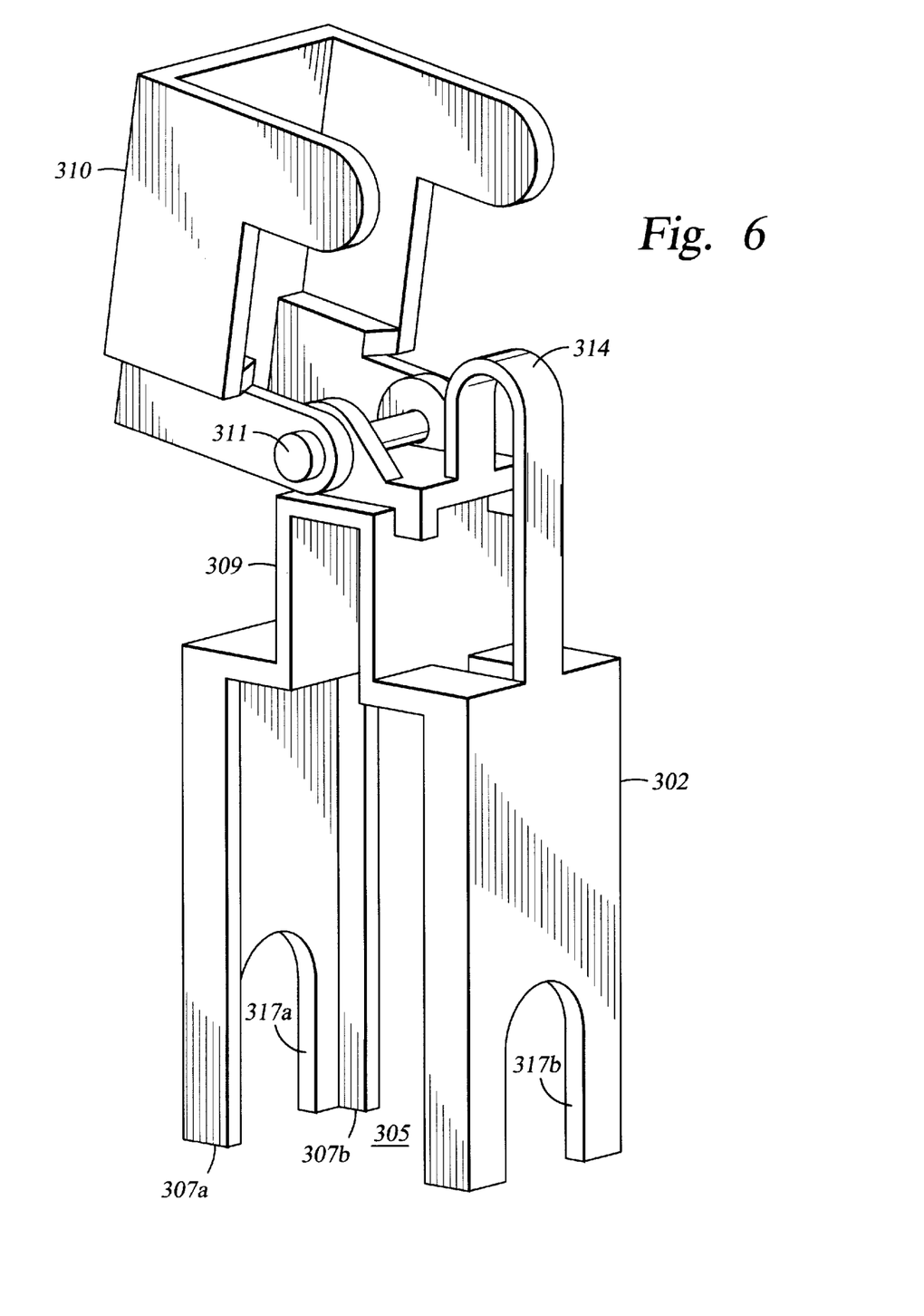
FIG. 6 is a perspective view of another embodiment of a valve lockout device according to the invention, shown without a valve and with the second piece of the device in an open position.
Figure 7:
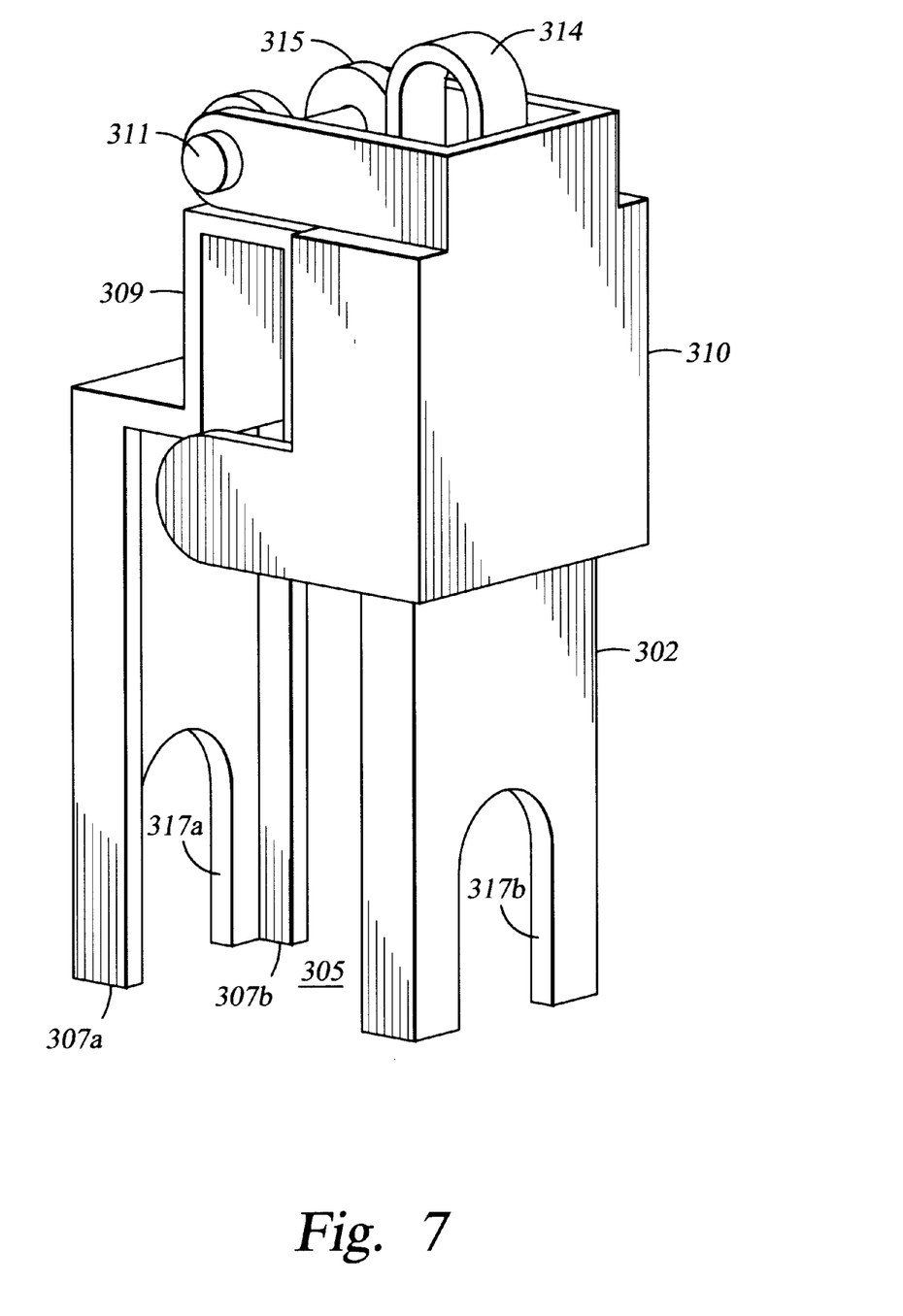
FIG. 7 is a perspective view showing the valve lockout device of FIG. 6 with the second piece of the device in a closed position.

FIGS. 6 and 7 show another embodiment of a valve lockout device according to the invention. In these figures, the valve and valve connection assembly are not shown. FIG. 6 shows a second piece 310 of the lockout device in an open position, and FIG. 7 shows the second piece 310 in a closed position. In this embodiment, a first piece 302 of the lockout device is a substantially block-shaped hollow object, open at a lower end 305 and with slots on two sides 307a–b. The first piece 302 has slots 317a–b for engaging the valve connection assembly (not shown) and also has a slotted pocket 309 for receiving the valve handle (not shown). When the first piece 302 is engaged with the valve connection assembly, by having the slots 317a–b engage tubular extensions of the valve body, the pocket 309 limits the motion of the valve handle (not shown) relative to the valve body (not shown), thereby preventing the valve handle from moving out of the closed position. As in the embodiment of FIGS. 2–5, the second piece 310 is a substantially U-shaped object as viewed from the side (this view is not shown but would be similar to the side view of FIG. 5). The second piece 310 is hinged to the first piece 302 by a pin 311 extending through holes in both pieces. When the second piece 310 is rotated to a closed position, as shown in FIG. 7, it closes the slots on the outside of the pocket 309, thereby capturing the valve handle (not shown) inside the pocket 309 and preventing removal of the valve lockout device.

In the embodiment of FIGS. 6 and 7, as in the embodiment of FIGS. 2–5, the first piece 302 includes a padlock loop 314 extending therefrom. When the second piece 310 is in its closed position, as shown in FIG. 4, an opening 315 in the second piece 310 receives the padlock loop 314. A portion of the padlock loop protrudes through the opening 315 so that putting a pin or rod such as a padlock (not shown) through the padlock loop 314 will prevent the second piece 310 from being rotated out of its closed position, thereby preventing removal of the valve lockout device.

Figure 8:
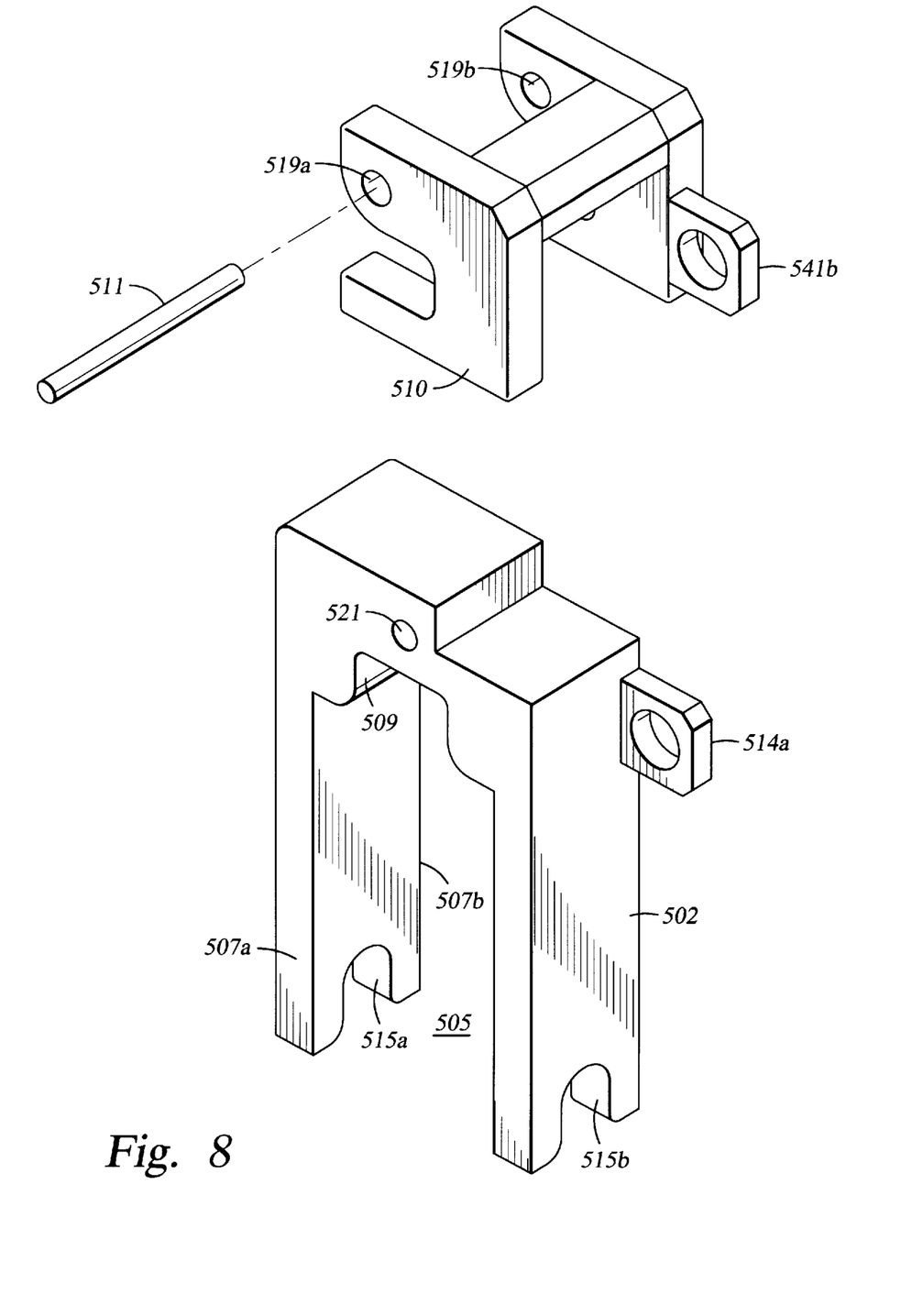
FIG. 8 is an exploded view of another embodiment of a valve lockout device according to the invention.

FIG. 8 shows an exploded view of another embodiment of a valve lockout device according to the invention. This embodiment is similar to the one shown in FIGS. 6 and 7, differing primarily in the padlock loop feature. Again, a first piece 502 is a substantially block-shaped hollow object, open at a bottom end 505 and having slots on two sides 507a–b. The first piece 502 has openings 515a–b for engaging the valve connection assembly (not shown) and also has a pocket 509 for receiving the valve handle (not shown). When the first piece 502 is engaged with the valve connection assembly, the pocket 509 limits the motion of the valve handle (not shown) relative to the valve body (not shown), thereby preventing the valve handle from moving out of the closed position. As before, a second piece 510 is a substantially U-shaped object as viewed from the side (this view is not shown but would be similar to the side view of FIG. 5). The second piece 510 is hinged to the first piece 502 by a pin 511 extending through holes 519a–b in the first piece and a hole 521 through the second piece. When the second piece 510 is rotated to a closed position, it closes the pocket 509, thereby capturing the valve handle (not shown) inside the pocket 509 and preventing removal of the valve lockout device.

In the embodiment of FIG. 8, there are two matching padlock loops 514a–b. One padlock loop 514b extends outward from the second piece 510, near the bottom of the "U," and is aligned so that a pin or rod inserted straight through the center of the padlock loop 514b would be parallel to the pin 511. Another padlock loop 514a extends outward from the first piece 502 and is positioned so that when the second piece 510 is in its closed position, the two padlock loops 514a–b are adjacent and aligned. In the closed position, putting a pin or rod such as a padlock (not shown) through the padlock loops 514a–b will prevent the second piece 510 from being rotated out of its closed position, thereby preventing removal of the valve lockout device.

Figure 9:
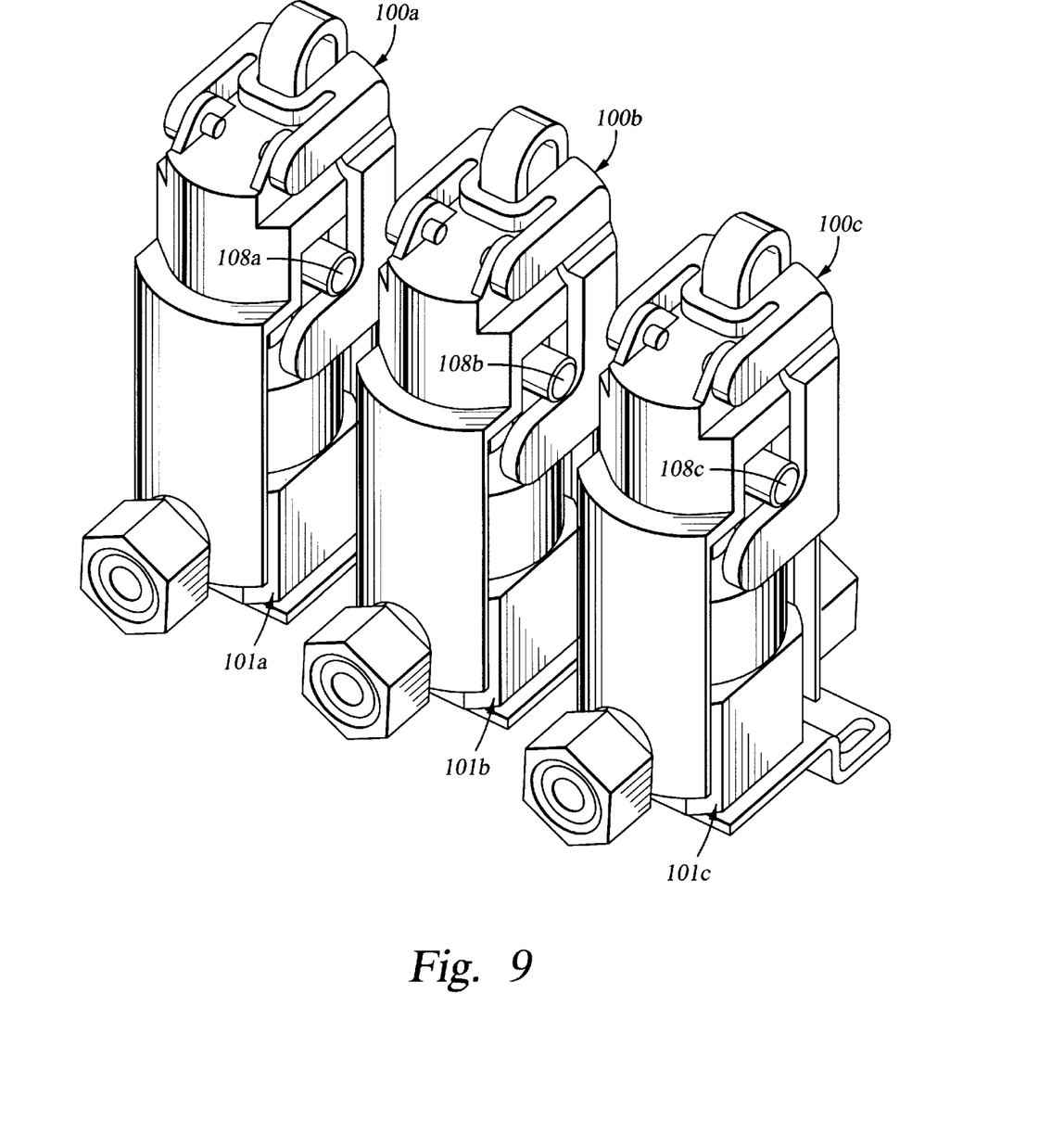
FIG. 9 is a perspective view of a set of closely spaced tubing-type valves, each having a valve lockout device as in FIG. 2 installed on it.
Figure 10:
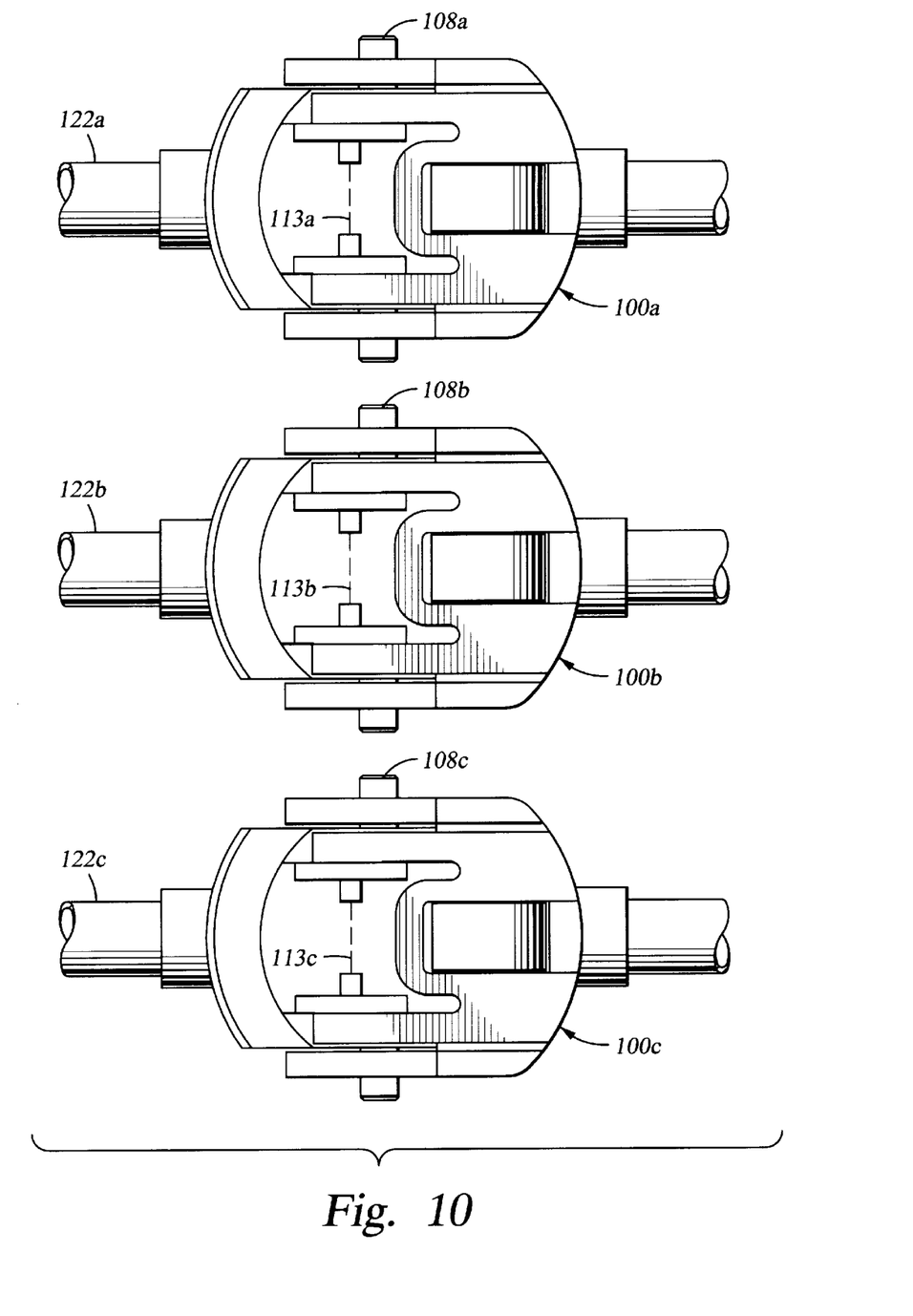
FIG. 10 is a top view of the set of valves and valve lockout devices of FIG. 9.

FIGS. 9 and 10 show how the valve lockout device 100 of FIGS. 2–5 can fit into tight spaces. As shown in these figures, a set of valves 101a–c, connected to external tubing 122a–c, are positioned closely together, side by side, locked by a set of valve lockout devices 100a–c of the type shown in FIGS. 2–5. FIG. 9 shows a perspective view and FIG. 10 shows a top view. The valves are configured close to one another but just far enough apart such that there is free rotation of the valve handles. Because the valve lockout devices 100a–c do not protrude beyond the valve handles 108a–c, and because the pivot axes 113a–c are substantially parallel to the valve handles 108a–c, valve lockout devices according to the invention easily fit within the tight spaces of such a valve arrangement. Valve lockout devices according to the invention fit within the side distance of a closely constructed valve set and can be used on any existing valve set without special accommodations. The lockout devices are completely self combined and can be moved from valve to valve as needed. The installation and removal of the lockout devices 100a–c do not interfere with each other or adjacent valve and piping hardware. This feature is especially useful for valves lined up in a valve box.

The valve lockout device in each of the embodiments described above can work with a variety of valves from different manufacturers because the dimensions are set to accommodate the valves of most known manufacturers and in each case, the valve lockout device is completely separate from the valve, does not depend on the internal structure of the valve, and requires no special structures associated with the valve. It is very easy to install because it fits over the valve and does not require any disassembly of the valve. It is simply a matter of rotating the second piece of the lockout device to an open position, setting the lockout device on the valve connection assembly, and then rotating the second piece to the closed position. Removal is accomplished by simply rotating the second piece to the open position and then lifting off the lockout device. No pieces are left behind (attached to the valve) after removal.

While the invention has been described with regards to specific embodiments, those skilled in the art will recognize that changes can be made in form and detail without departing from the spirit and scope of the invention.

We claim:

1. A valve lockout device for locking a valve handle in a fixed position, said valve lockout device comprising:
    a first piece configured to removably engage a portion of a valve connection assembly, said first piece having a pocket with at least one slot; and
    a second piece pivotally attached to said first piece and including a closure lever arm wherein in a closed position said lever arm blocks said at least one slot, and when said second piece is pivoted to an open position, said at least one slot is not blocked by said closure lever arm.

2. The valve lockout device of claim 1 wherein the axis of said pivotal attachment is substantially parallel to said valve handle.

3. The valve lockout device of claim 2 wherein said second piece, as viewed in a plane perpendicular to the axis of said pivotal attachment, comprises a substantially U-shaped object.

4. The valve lockout device of claim 1 wherein said first piece has a padlock loop extending therefrom, and said second piece has an opening for receiving said padlock loop, said padlock loop and said opening positioned so that when said second piece is in said closed position, a portion of said padlock loop protrudes through said opening, whereby a pin or rod such as a padlock inserted through said protruding portion of said padlock loop prevents said second piece from being removed from said closed position.

5. The valve lockout device of claim 1 wherein said first piece has a first padlock loop extending therefrom, and said second piece has a second padlock loop extending therefrom, said first and second padlock loops positioned so that when said second piece is in said closed position, said first and second padlock loops are aligned, whereby a pin or rod such as a padlock inserted through said first and second padlock loops prevents said second piece from being removed from said closed position.

6. The valve lockout device of claim 2 wherein said first piece has a padlock loop extending therefrom, and said second piece has an opening for receiving said padlock loop, said padlock loop and said opening positioned so that when said second piece is in said closed position, a portion of said padlock loop protrudes through said opening, whereby a pin or rod such as a padlock inserted through said protruding portion of said padlock loop prevents said second piece from being removed from said closed position.

7. The valve lockout device of claim 2 wherein said first piece has a first padlock loop extending therefrom, and said second piece has a second padlock loop extending therefrom, said first and second padlock loops positioned so that when said second piece is in said closed position, said first and second padlock loops are aligned, whereby a pin or rod such as a padlock inserted through said first and second padlock loops prevents said second piece from being removed from said closed position.

8. The valve lockout device of claim 3 wherein said first piece has a padlock loop extending therefrom, and said second piece has an opening for receiving said padlock loop, said padlock loop and said opening positioned so that when said second piece is in said closed position, a portion of said padlock loop protrudes through said opening, whereby a pin or rod such as a padlock inserted through said protruding portion of said padlock loop prevents said second piece from being removed from said closed position.

9. The valve lockout device of claim 3 wherein said first piece has a first padlock loop extending therefrom, and said second piece has a second padlock loop extending therefrom, said first and second padlock loops positioned so that when said second piece is in said closed position, said first and second padlock loops are aligned, whereby a pin or rod such as a padlock inserted through said first and second padlock loops prevents said second piece from being removed from said closed position.

10. A valve lockout device for locking a valve handle in a fixed position, said valve lockout device comprising:
a first piece, wherein said first piece comprises a hollow object, open at a bottom end and with slots on two sides, said hollow object having an opening for engaging a valve connection assembly of a valve and further having a pocket with at least one slot; and
a second piece pivotally attached to said first piece and including a closure lever arm wherein in a closed position said lever arm blocks said at least one slot, and when said second piece is pivoted to an open position, said at least one slot is not blocked by said closure lever arm.

11. The valve lockout device of claim 10 wherein the axis of said pivotal attachment is substantially parallel to said valve handle.

12. The valve lockout device of claim 11 wherein said second piece, as viewed in a plane perpendicular to the axis of said pivotal attachment, comprises a substantially U-shaped object.

13. The valve lockout device of claim 10 wherein said first piece has a padlock loop extending therefrom, and said second piece has an opening for receiving said padlock loop, said padlock loop and said opening positioned so that when said second piece is in said closed position, a portion of said padlock loop protrudes through said opening, whereby a pin or rod such as a padlock inserted through said protruding portion of said padlock loop prevents said second piece from being removed from said closed position.

14. The valve lockout device of claim 10 wherein said first piece has a first padlock loop extending therefrom, and said second piece has a second padlock loop extending therefrom, said first and second padlock loops positioned so that when said second piece is in said closed position, said first and second padlock loops are aligned, whereby a pin or rod such as a padlock inserted through said first and second padlock loops prevents said second piece from being removed from said closed position.

15. The valve lockout device of claim 11 wherein said first piece has a padlock loop extending therefrom, and said second piece has an opening for receiving said padlock loop, said padlock loop and said opening positioned so that when said second piece is in said closed position, a portion of said padlock loop protrudes through said opening, whereby a pin or rod such as a padlock inserted through said protruding portion of said padlock loop prevents said second piece from being removed from said closed position.

16. The valve lockout device of claim 11 wherein said first piece has a first padlock loop extending therefrom, and said second piece has a second padlock loop extending therefrom, said first and second padlock loops positioned so that when said second piece is in said closed position, said first and second padlock loops are aligned, whereby a pin or rod such as a padlock inserted through said first and second padlock loops prevents said second piece from being removed from said closed position.

17. The valve lockout device of claim 12 wherein said first piece has a padlock loop extending therefrom, and said second piece has an opening for receiving said padlock loop, said padlock loop and said opening positioned so that when said second piece is in said closed position, a portion of said padlock loop protrudes through said opening, whereby a pin or rod such as a padlock inserted through said protruding portion of said padlock loop prevents said second piece from being removed from said closed position.

18. The valve lockout device of claim 12 wherein said first piece has a first padlock loop extending therefrom, and said second piece has a second padlock loop extending therefrom, said first and second padlock loops positioned so that when said second piece is in said closed position, said first and second padlock loops are aligned, whereby a pin or rod such as a padlock inserted through said first and second padlock loops prevents said second piece from being removed from said closed position.

19. A valve lockout device for locking a valve in a fixed position, said valve lockout device comprising:
a first piece that fits over said valve, said first piece comprising means for limiting the movement of the valve handle of said valve relative to the valve body of said valve, thereby preventing the operation of said valve; and
a second piece pivotally attached to said first piece, said second piece comprising means for preventing the removal of said valve lockout device when said second piece is in a closed position with respect to said first piece.

20. The valve lockout device of claim 19 further comprising padlock loop means for receiving a padlock and preventing said second piece from being removed from said closed position when a padlock is in place.

21. A method for locking a valve in a fixed position, said method comprising the steps of:
placing a valve lockout device over said valve;
engaging a first piece of said valve lockout device with a valve connection assembly for said valve;
causing the valve handle of said valve to be received in a pocket of said first piece, thereby limiting the movement of said valve handle relative to the valve body of said valve and preventing the operation of said valve; and
rotating a second piece, pivotally attached to said first piece, into a closed position with respect to said first piece, to capture said valve handle in said pocket and prevent the removal of said valve lockout device.

22. The method of claim 21 wherein the step of rotating a second piece into a closed position with respect to said first piece further causes a padlock loop extending from said first piece to be received in an opening in said second piece so that a portion of said padlock loop protrudes through said opening, said method further comprising the step of inserting a pin or rod such as a padlock through said protruding portion of said padlock loop, thereby preventing said second piece from being removed from said closed position.

23. The method of claim 21 wherein the step of rotating a second piece into a closed position with respect to said first piece further causes a first padlock loop extending from said first piece to be aligned with a second padlock loop extending from said second piece, said method further comprising the step of inserting a pin or rod such as a padlock through said first and second padlock loops, thereby preventing said second piece from being removed from said closed position.

24. A method for locking a valve in a fixed position, said method comprising the steps of:

placing a valve lockout device over said valve, wherein a first piece of said valve lockout device limits the movement of the valve handle of said valve relative to the valve body of said valve, thereby preventing the operation of said valve; and     rotating a second piece, pivotally attached to said first piece, into a closed position with respect to said first piece, wherein said second piece prevents the removal of said valve lockout device when said second piece is in said closed position.

25. The method of claim 24 further comprising the step of inserting a pin or rod such as a padlock through a padlock loop on said valve lockout device, thereby preventing said second piece from being removed from said closed position.

\* \* \* \* \*